(12) United States Patent
Choi et al.

(10) Patent No.: US 10,852,546 B2
(45) Date of Patent: Dec. 1, 2020

(54) HEAD MOUNTED DISPLAY AND MULTIPLE DEPTH IMAGING APPARATUS

(71) Applicant: HTC Corporation, Taoyuan (TW)

(72) Inventors: Iok Kan Choi, Taoyuan (TW); Ling-Yi Ding, Taoyuan (TW); Yu-Heng Chen, Taoyuan (TW); Po-Sen Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 115 days.

(21) Appl. No.: 16/182,605

(22) Filed: Nov. 7, 2018

(65) Prior Publication Data

US 2020/0041792 A1 Feb. 6, 2020

Related U.S. Application Data

(60) Provisional application No. 62/712,987, filed on Aug. 1, 2018.

(51) Int. Cl.
*G02B 27/01* (2006.01)
*G02B 27/09* (2006.01)
*G02B 27/14* (2006.01)

(52) U.S. Cl.
CPC ..... *G02B 27/0172* (2013.01); *G02B 27/0955* (2013.01); *G02B 27/142* (2013.01)

(58) Field of Classification Search
CPC ............ G02B 27/0172; G02B 27/0955; G02B 27/142
USPC ........................................................ 359/630
See application file for complete search history.

(56) References Cited

U.S. PATENT DOCUMENTS

| 595,618 A | 12/1897 | Gambs |
| 2016/0054563 A9 * | 2/2016 | Fujimura ............... G02B 27/01 |
| | | 359/630 |

FOREIGN PATENT DOCUMENTS

WO 2017164501 9/2017

OTHER PUBLICATIONS

"Search Report of Europe Counterpart Application", dated Oct. 2, 2019, pp. 1-4.

* cited by examiner

Primary Examiner — Thomas K Pham
Assistant Examiner — Mitchell T Oestreich
(74) Attorney, Agent, or Firm — JCIPRNET

(57) ABSTRACT

A head mounted display and a multiple depth imaging apparatus thereof are provided. The imaging apparatus includes a beam splitting device, a first display, a second display, a third display and a lens set. The beam splitting device has a first reflective surface, a second reflective surface and a transmissive surface. The first display projects a first image to the first reflective surface. The second display projects a second image to the transmissive surface. The third display projects a third image to the second reflective surface. The lens set is disposed between the beam splitting device and a target area. The first image, second image and third image are respectively imaging on a first imaging surface, a second imaging surface and a third imaging surface, and distances between the target area and the first, second and third imaging surfaces are different.

8 Claims, 4 Drawing Sheets ical Field

The invention relates to a head mounted display and an imaging apparatus thereof, and more particularly relates to a head mounted display having a multiple depth imaging apparatus.

Description of Related Art

In the field of technology nowadays, a three-dimensional image makes use of vergence movements of the eyes, so that an image recognized by the brain appears in space, and a sense of space with depth is thereby formed. After two images with binocular parallax generated in the virtual environment are projected to the retinas of the eyes of the user, the lines of sight, similar to being in the real world, may focus on random virtual objects in the virtual environment. Nevertheless, in a display image, each of the virtual objects featuring obvious depth perception and placed at different front and back positions does not appear in the corresponding visual depth, and just like being shown on a flat display image, each of the objects is presented in the same visual depth instead. Such phenomenon does not follow the normal visual physiology, and the normal visual physiological function is changed, so that disharmony or even conflicts are caused between accommodation and vergence.

As light rays emitted by a display image of a head mounted display do not provide depth information, when the head mounted display is used for a long time, symptoms such as visual fatigue, dry eyes, dizziness and double vision, photophobia, nausea, vomiting, etc. may begin to appear.

HEAD MOUNTED DISPLAY AND MULTIPLE DEPTH IMAGING APPARATUS

CROSS-REFERENCE TO RELATED APPLICATION

This application claims the priority benefit of U.S. provisional application Ser. No. 62/712,987, filed on Aug. 1, 2018. The entirety of the above-mentioned patent application is hereby incorporated by reference herein and made a part of this specification.

BACKGROUND

Technical Field

SUMMARY

The invention provides a head mounted display and an imaging apparatus thereof capable of lowering influences caused by the vergence-accommodation conflict.

The invention provides an imaging apparatus including a beam splitting device, a first display, a second display, a third display, and a lens set. The beam splitting device has a first reflective surface, a second reflective surface and a transmissive surface. The first display projects a first image to the first reflective surface. The second display projects a second image to the transmissive surface. The third display projects a third image to the second reflective surface. The first reflective surface reflects the first image to the target area, the second reflective surface reflects the third image to the target area, and the second image is projected to the target area through the transmissive surface. The lens set is disposed between the beam splitting device and a target area. The first image, second image and third image are respectively imaging on a first imaging surface, a second imaging surface and a third imaging surface, and distances between the target area and the first, second and third imaging surfaces are different.

The invention further provides a head mounted display including a housing and one or a plurality of imaging apparatuses as described above. The imaging apparatus is disposed in the housing.

To sum up, the beam splitting device is provided by the invention to enable multiple images to be imaged on the imaging surfaces on different positions, and through generating images of different depths by the imaging apparatus, dizziness felt by the user caused by the vergence-accommodation conflict is therefore reduced.

To make the aforementioned more comprehensible, several embodiments accompanied with drawings are described in detail as follows.

DESCRIPTION OF THE EMBODIMENTS

Figure 1:
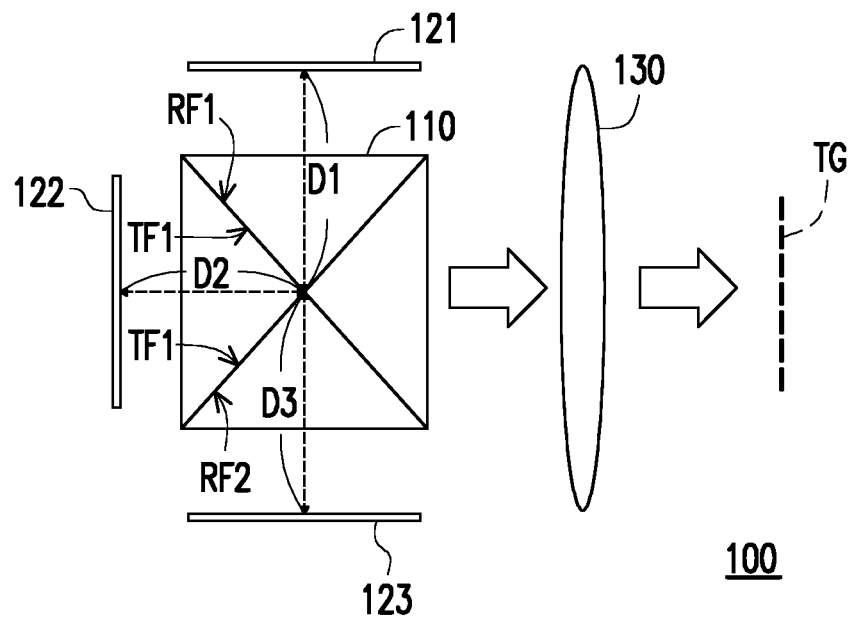
FIG. 1 is a schematic diagram illustrating an imaging apparatus according to an embodiment of the invention.

With reference to FIG. 1, FIG. 1 is a schematic diagram illustrating an imaging apparatus according to an embodiment of the invention. An imaging apparatus 100 includes a beam splitting device 110, displays 121, 122, and 123, and a lens set 130. The beam splitting device 110 has a first reflective surface RF1, a second reflective surface RF2, and a transmissive surface TF1. The display 121 is configured to project a first image to the first reflective surface RF1, and the first reflective surface RF1 then projects the first image, so that the first image is projected to the target area TG. The display 122 is configured to project a second image towards the transmissive surface TF1, and the second image passes through the transmissive surface TF1 of the beam splitting device 110 to be projected to the target area TG. The display 123 projects a third image to the second reflective surface RF2 of the beam splitting device 110, and the second reflective surface RF2 then reflects the third image, so that the third image is projected to the target area TG.

The lens set 130 is disposed between the beam splitting device 110 and the target area TG, is configured to enable the first image, the second image, and the third image to focus, and enables the first image, the second image, and the third image to be imaged on different first imaging surface, the second imaging surface, and the third imaging surface. The point is that distances between the first imaging surface, the second imaging surface, and the third imaging surface and the target area TG are different.

Figure 2:
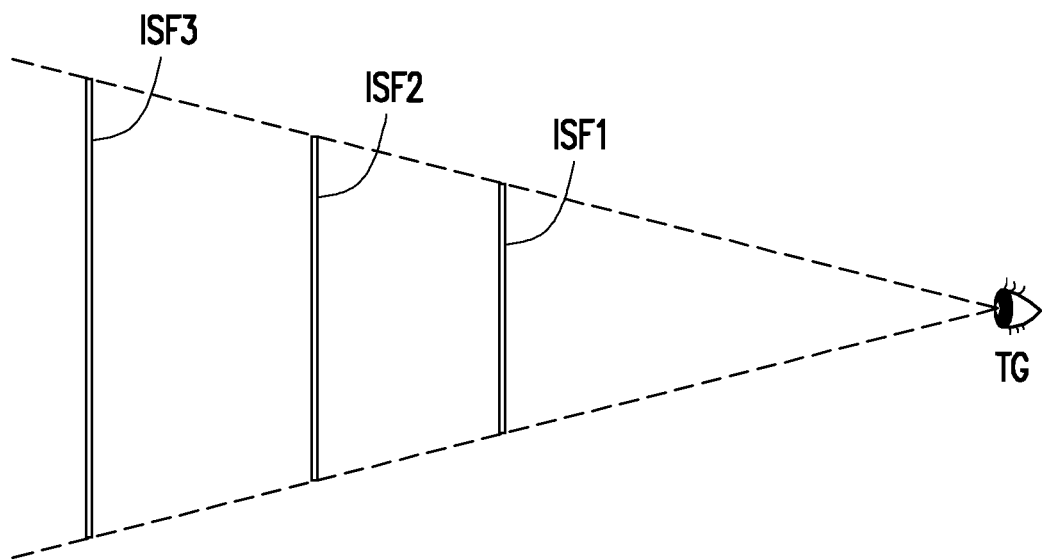
FIG. 2 is a schematic diagram illustrating positions of imaging surfaces according to an embodiment of the invention.

With reference to FIG. 1 and FIG. 2 together, FIG. 2 is a schematic diagram illustrating positions of imaging surfaces according to an embodiment of the invention. In FIG. 2, the target area TG is an area of an eye of a user, and through the imaging apparatus 100, the first image, the second image, and the third image may respectively be imaged on a first imaging surface ISF1, a second imaging surface ISF2, and a third imaging surface ISF3. In this embodiment, a distance between the first imaging surface ISF1 and the target area TG is less than a distance between the second imaging surface ISF2 and the target area TG, and the distance between the second imaging surface ISF2 and the target area TG is less than a distance between the third imaging surface ISF3 and the target area TG.

With reference to FIG. 1 again, in the embodiments of the invention, in order to enable the positions of the imaging surfaces (the first imaging surface ISF1, the second imaging surface ISF2, and the third imaging surface ISF3) of the first image, the second image, and the third image to be different, a vertical distance D1 may be provided between the display 121 generating the first image and an intersection point between the first reflective surface RF1 and the second reflective surface RF2, a vertical distance D2 may be provided between the display 122 generating the second image and a center point of the transmissive surface TF1, a vertical distance D3 may be provided between the display 123 generating the third image and the intersection point between the first reflective surface RF1 and the second reflective surface RF2, and the vertical distances D1, D2, and D3 are enabled to be different (e.g., are enabled to be the vertical distance D1<vertical distance D2<vertical distance D3). In this way, the first image, the second image, and the third image are enabled to be imaged respectively on the first imaging surface ISF1, the second imaging surface ISF2, and the third imaging surface ISF3 having different depths.

Based on the above description, it can be easily seen that an image may be divided into the first image, the second image, and the third image according to depths in the embodiments of the invention, and through the imaging apparatus 100, the first image, the second image, and the third image are imaged on the first imaging surface ISF1, the second imaging surface ISF2, and the third imaging surface ISF3 with different depths. In this way, when the user views an image, multiple objects in the image may be similar to that in an actual image because multiple different depths of focus are provided, so dizziness feeling felt by the user caused by the vergence-accommodation conflict may be effectively reduced, and the user thereby feels more comfortable.

Figure 3:
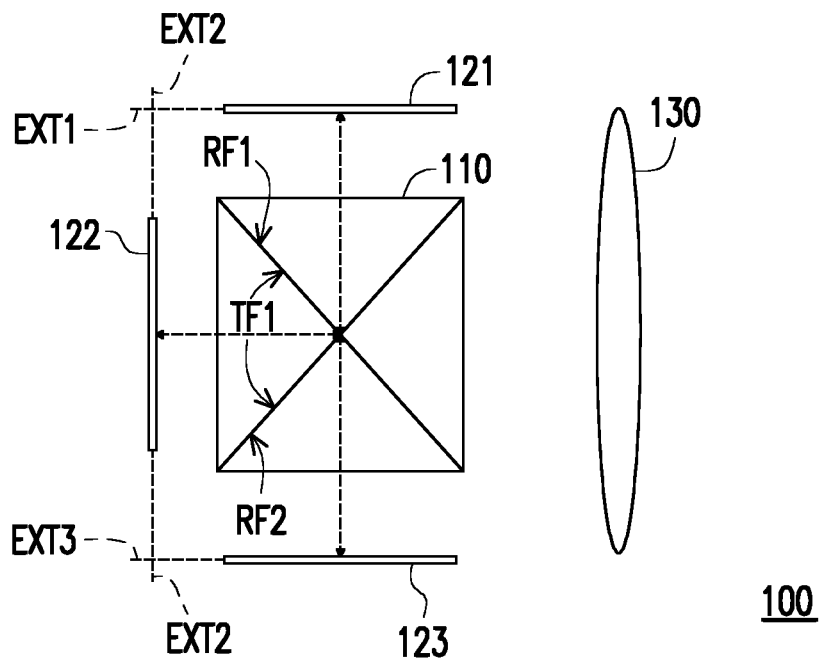
FIG. 3 is a schematic diagram illustrating how the imaging apparatus is disposed in detail according to an embodiment of the invention.

As regards how the imaging apparatus is disposed in the embodiments of the invention, with reference to FIG. 3, which is a schematic diagram illustrating how the imaging apparatus is disposed in detail according to an embodiment of the invention. In FIG. 3, the beam splitting device 110 may be a rectangular beam splitting device, the first reflective surface RF1 and the second reflective surface RF2 may be disposed along two diagonals of the rectangular beam splitting device 110, and the surface TF1 is formed behind the first reflective surface RF1 and the second reflective surface RF2. The displays 121 to 123 may be individually disposed adjacent to three different sides of the beam splitting device 110, the display 121 may be opposite to the display 123, an extending line EXT1 of the display 121 may intersect an extending line EXT2 of the display 122, and an extending line EXT3 of the display 123 may intersect the extending line EXT2 of the display 122. In this embodiment, the display 121 may be disposed parallel to the display 123, the extending line EXT1 and the extending line EXT2 may be orthogonal to each other, and the extending line EXT3 and the extending line EXT2 may be orthogonal to each other, but is not limited in this regard.

Figure 4A:
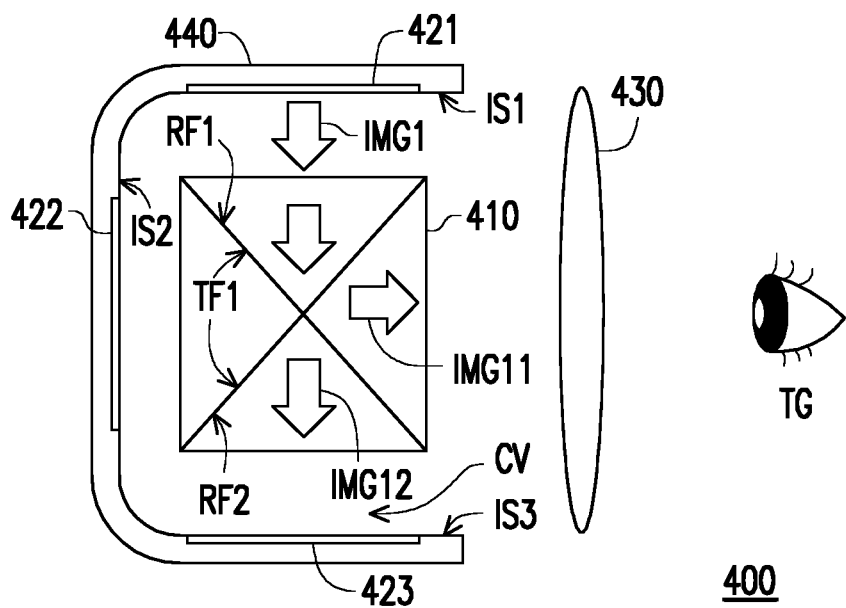
FIG. 4A to FIG. 4C are schematic diagrams illustrating an imaging apparatus and a generated image transmission path according to an embodiment of the invention.
Figure 4B:
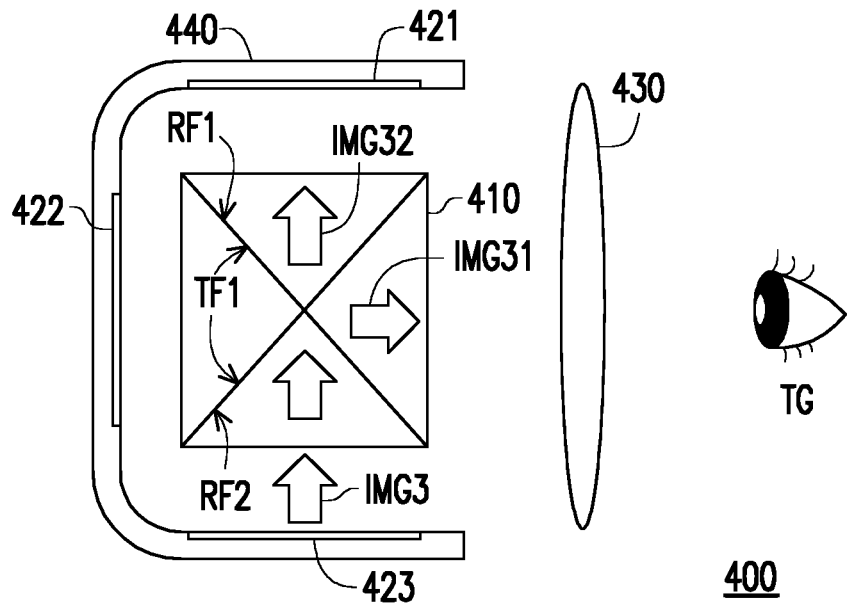
Figure 4C:
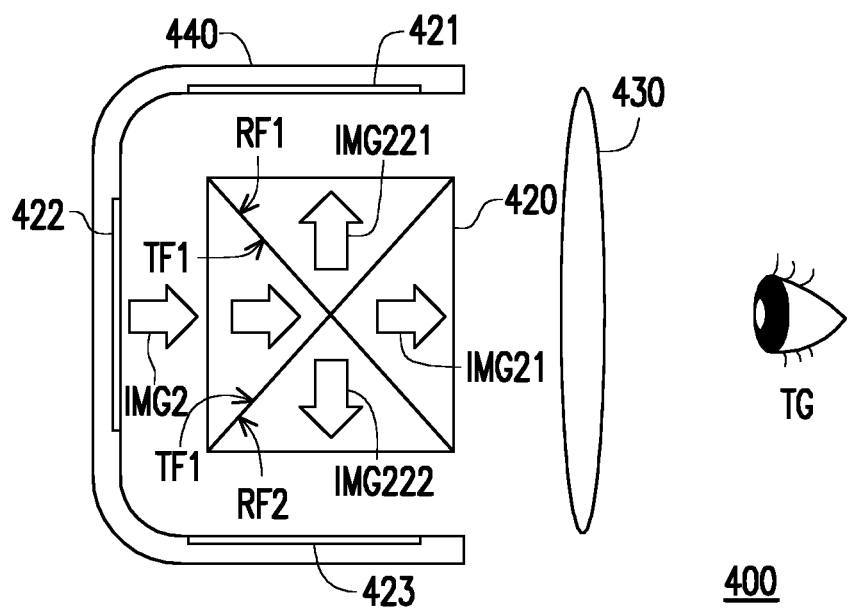

With reference to FIG. 4A to FIG. 4C, FIG. 4A to FIG. 4C are schematic diagrams illustrating an imaging apparatus and a generated image transmission path according to an embodiment of the invention. An imaging apparatus 400 includes a beam splitting device 410, displays 421 to 423, a frame 440, and a lens set 430. The frame 440 has inner surfaces IS1 to IS3, the inner surfaces IS1 and IS3 are opposite, the inner surface IS1 is in contact with the inner surface IS2, the inner surface IS2 is in contact with the inner surface IS3, and that a semi-enclosed structure is formed. The displays 421 to 423 are disposed respectively on the inner surfaces IS1 to IS3. The inner surfaces IS1 to IS3 form a concave channel CV, and the beam splitting device 410 may be disposed in the concave channel CV.

From another perspective, in the embodiments of the invention, a first coated film may be disposed on the first reflective surface RF1. When a first image IMG1 generated by the display 421 is sent to the first reflective surface RF1, the first coated film may reflect a first image IMG11 of a first ratio to the target area TG and transmits a first image IMG12 of a second ratio, where the first ratio is greater than or equal to the second ratio. That is, through functioning of the first coated film on the first reflective surface RF1, the first image IMG11 of the first ratio may be sent to the target area TG, and brightness of the first image IMG11 of the first ratio may be greater than or equal to that of the first image IMG12 of the second ratio.

In FIG. 4B, a second coated film may be disposed on the second reflective surface RF2. When a third image IMG3 generated by the display 423 is sent to the second reflective surface RF2, the second coated film may reflect a third image IMG31 of a third ratio to the target area TG and transmits a third image IMG32 of a fourth ratio, where the third ratio is greater than or equal to the fourth ratio. That is, through functioning of the second coated film on the second reflective surface RF2, the third image IMG31 of the third ratio may be sent to the target area TG, and brightness of the third image IMG31 of the third ratio may be greater than or equal to that of the third image IMG32 of the fourth ratio.

In FIG. 4C, the transmissive surface TF1 may receive a second image IMG2 generated by the display 422, and a third coated film may be disposed on the transmissive surface TF1. The third coated film may be configured to transmit a second image IMG21 of a fifth ratio to the target area TG and reflects second images IMG221 and IMG222 of the sixth ratio, where the fifth ratio is greater than or equal to the sixth ratio. That is to say, the third coated film may send the second image IMG21 of the fifth ratio to the target area TG, and brightness of the second image IMG21 of the fifth ratio may be greater than or equal to that of the second images IMG221 and IMG222 of the sixth ratio.

Figure 5:
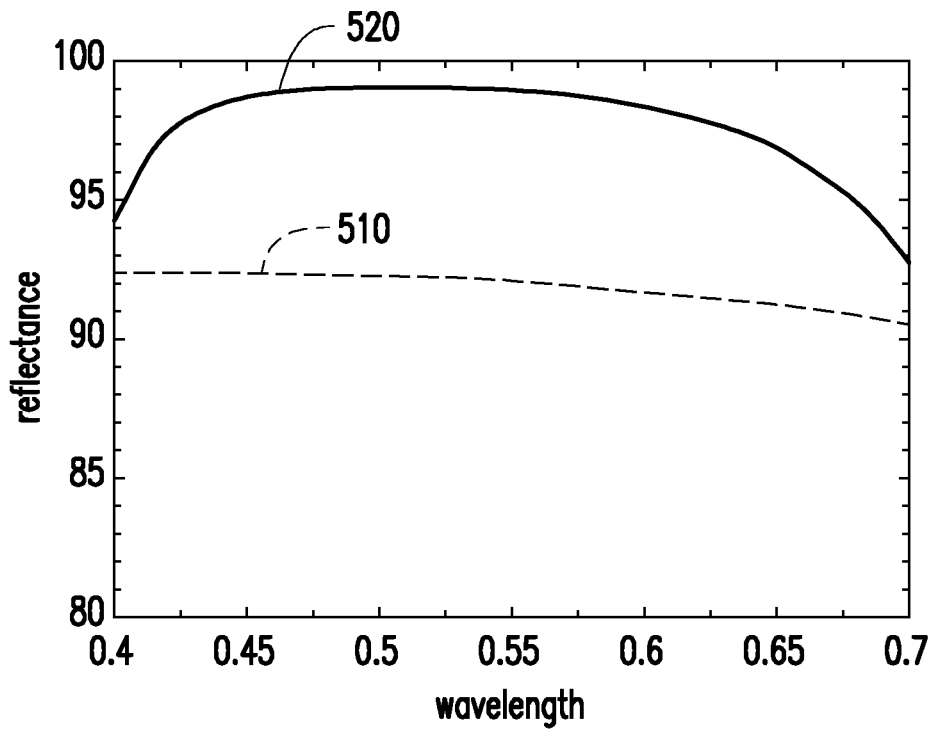
FIG. 5 is a schematic chart illustrating a relationship between coated film reflectance and image wavelengths.

Materials of the first coated film, the second coated film, and the third coated film may be selected according to wavelengths of the first image and the second image required to be reflected. With reference to a schematic chart of FIG. 5, which illustrates a relationship between coated film reflectance and image wavelengths. In FIG. 5, a curve 510 represents a relationship between an image wavelength of a reflective surface without a coated film being disposed thereon and the reflectance, and curve 520 represents a relationship between the image wavelength of the reflective surface after a coated film being disposed thereon and the reflectance. Through selecting a material featuring high reflectance for the first coated film corresponding to the wavelength of the first image, the brightness of the first image of the first ratio of the first image reflected to the target area is increased, and similarly, through selecting a material featuring high reflectance for the second coated film corresponding to the wavelength of the third image, the brightness of the third image of the third ratio of the third image reflected to the target area is increased. In addition, through selecting a material featuring high transmittance for the third coated film corresponding to the wavelength of the second image, the brightness of the second image of the fifth ratio of the second image transmitted to the target area is increased. Through selecting the appropriate materials for the first coated film, the second coated film, and the third coated film, light intensity of a display image entering into the eye may be significantly increased, and that energy efficiency is effectively increased.

Figure 6:
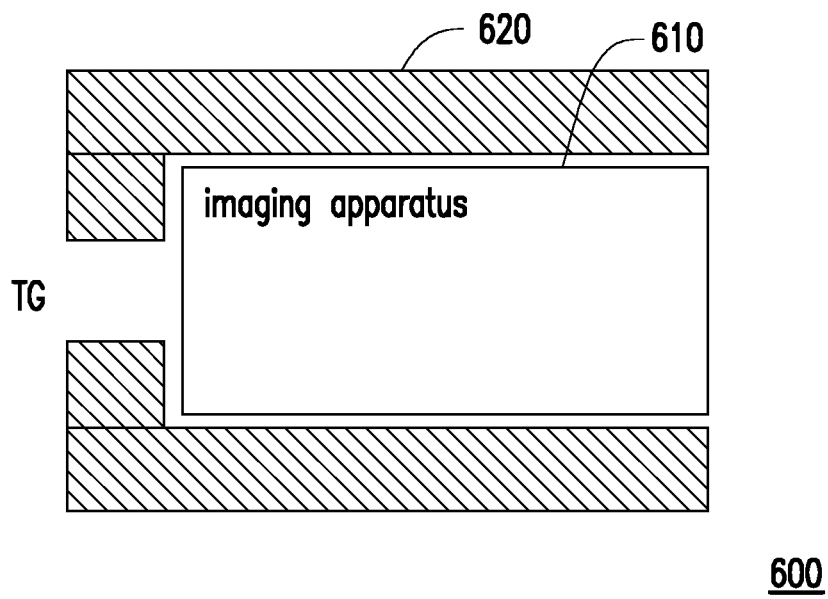
FIG. 6 is a schematic view illustrating a head mounted display according to an embodiment of the invention.

With reference to FIG. 6, FIG. 6 is a schematic view illustrating a head mounted display according to an embodiment of the invention. A head mounted display 600 includes one or a plurality of imaging apparatuses 610 and a housing 620. The imaging apparatus 610 corresponds to the target area TG to be disposed in the housing 620.

The imaging apparatus 610 in this embodiment may be implemented through the imaging apparatus 100 or 400 of in the foregoing embodiments. As regards detailed description of how the imaging apparatus 100 or 400 works, in the foregoing embodiments and implementation, detailed description is provided, and a relevant description thereof is thus omitted.

In view of the foregoing, the beam splitting device is provided by the invention, so as to perform reflection and transmission for the displays featuring different depth distances and to enable plural images to be individually imaged on imaging surfaces of different depths. In this way, the imaging apparatus may generate a display image showing multiple objects with different depths just like an actual image, so that dizziness felt by the user caused by the vergence-accommodation conflict is therefore effectively reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging apparatus, comprising:
   a beam splitting device, having a first reflective surface, a second reflective surface, and a transmissive surface integrated as a single piece beam splitting device;
   a first display, configured to project a first image to the first reflective surface;
   a second display, configured to project a second image to the transmissive surface;
   a third display, configured to project a third image to the second reflective surface,
      wherein the first reflective surface reflects the first image to a target area, the second reflective surface reflects the third image to the target area, and the second image is projected to the target area through the transmissive surface; and
   a lens set, disposed between the beam splitting device and the target area,
      wherein the first image, the second image, and the third image are respectively imaged on a first imaging surface, a second imaging surface, and a third imaging surface, and distances between the first imaging surface, the second imaging surface, and the third imaging surface and the target area are different.

2. The imaging apparatus as claimed in claim 1, wherein a first vertical distance is provided between the first display and an intersection point between the first reflective surface and the second reflective surface, a second vertical distance is provided between the second display and a center point of the transmissive surface, a third vertical distance is provided between the third display and the intersection point between the first reflective surface and the second reflective surface; the first vertical distance, the second vertical distance, and the third vertical distance are different.

3. The imaging apparatus as claimed in claim 1, further comprising:
   a frame, having a first inner surface, a second inner surface, and a third inner surface; the first display, the second display, and the third display are respectively disposed on the first inner surface, the second inner surface, and the third inner surface;
   wherein the first inner surface is opposite to the third inner surface, the first inner surface is in contact with the second inner surface, and the third inner surface is in contact with the second inner surface.

4. The imaging apparatus as claimed in claim 3, wherein the first inner surface, the second inner surface, and the third inner surface form a concave channel, and the beam splitting device is disposed in the concave channel.

5. The imaging apparatus as claimed in claim 3, wherein the first reflective surface has a first coated film, and the first coated film is configured to reflect a first portion of the first image to the target area and transmits a second portion of the first image to the target area, wherein the first portion is greater than or equal to the second portion.

6. The imaging apparatus as claimed in claim 5, wherein the second reflective surface has a second coated film, and the second coated film is configured to reflect a third portion of the third image to the target area and transmits a fourth portion of the third image to the target area, wherein the third portion is greater than or equal to the fourth portion.

7. The imaging apparatus as claimed in claim 6, wherein the transmissive surface has a third coated film, and the third coated film is configured to transmit a fifth portion of the second image to the target area and reflects a sixth portion of the second image to the target area, wherein the fifth portion is greater than or equal to the sixth portion.

8. A head mounted display, comprising:
   a housing; and
   at least one imaging apparatus, disposed in the housing;
   wherein the imaging apparatus comprising:
      a beam splitting device, having a first reflective surface, a second reflective surface, and a transmissive surface integrated as a single piece beam splitting device;
      a first display, configured to project a first image to the first reflective surface;
      a second display, configured to project a second image to the transmissive surface;
      a third display, configured to project a third image to the second reflective surface,
         wherein the first reflective surface reflects the first image to a target area, the second reflective surface reflects the third image to the target area, and the second image is projected to the target area through the transmissive surface; and
      a lens set, disposed between the beam splitting device and the target area, wherein the first image, the second image, and the third image are respectively imaged on a first imaging surface, a second imaging surface, and a third imaging surface, and distances between the first imaging surface, the second imaging surface, and the third imaging surface and the target area are different.

\* \* \* \* \*